C. S. AMBRUSTER.
Hay Fork.

No. 81,726.

Patented Sept. 1, 1868.

Witnesses
C. A. Pettu
G. E. Kenyon

Inventor
C. S. Ambruster
By Munn & Co
Attorneys

United States Patent Office.

CHARLES S. AMBRUSTER, OF WOODSTOWN, NEW JERSEY, ASSIGNOR TO HIMSELF AND CHARLES H. RICHMAN, OF SAME PLACE.

Letters Patent No. 81,726, dated September 1, 1868.

IMPROVEMENT IN HAY-FORKS.

The Schedule referred to in these Letters Patent and making part of the same.

TO ALL WHOM IT MAY CONCERN:

Be it known that I, CHARLES S. AMBRUSTER, of Woodstown, in the county of Salem, and State of New Jersey, have invented a new and improved Hay-Fork; and I do hereby declare that the following is a full, clear, and exact description of the construction and operation of the same, reference being had to the accompanying drawings, making a part of this specification, in which—

Figure 1:
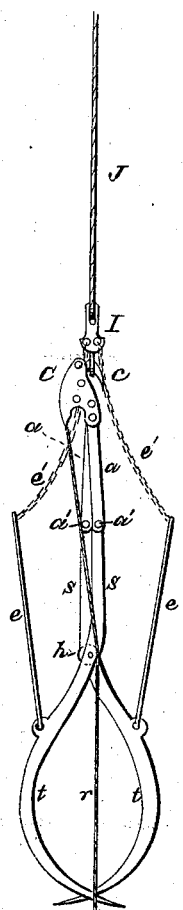

Figure 1 is a side elevation, and

Figure 2:
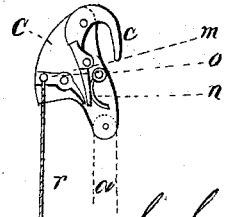

Figure 2 a detached sectional view of the tripping-apparatus.

The object of this invention is to provide a neat, cheap, and convenient hay-fork, by which the hay can be grasped securely, and firmly held while being elevated, and can be instantly released when arriving at the place where it is desired to deposit it.

To accomplish this object, I construct a fork having two curved tines, $t\ t$, on each side, which unite at their upper extremity and form a shank or tang $s$. One of the shanks thus formed, crosses, and is pivoted to the other at $p$. An arm, $a$, is hinged to the upper end of each shank, as seen at $a'$, the upper ends of the arms being hinged together to a plate, C.

A rod, $e$, is hinged to the back of each tine, as shown in fig. 1, and is connected at its upper end to a block or hook, I, by means of a cord or chain, $e'$. When it is desired to elevate the fork, the block I is hooked to a hook, $c$, on the plate C, and is raised by means of a rope, J. The whole draught of the rope J thus comes upon the plate C, drawing it up, bringing the arms $a\ a$ and the shanks $s\ s$ together, and causing the tines to approach each other, and grasp the hay firmly between them while raising it. When the hay has been raised to the point where it is to be discharged, the operator pulls upon a rope, $r$, and disengages the block I from the plate C, taking the whole weight of the hay and fork from the plate C, and throwing it upon the block. As the block is connected only to the back of the tines, and at some distance below the pivot $p$, as above described, it immediately draws them apart, and releases the hay from them. The fork is then lowered, the tines being still spread apart, and receives another load, after which the block is again connected to the plate C, and the load can be raised and discharged as before.

The apparatus by which the hook $c$ serves to hold the weight of the load ordinarily, and yet to release it and allow it to drop when the rope $r$ is pulled, is clearly shown in fig. 2, and consists simply of a pivoted hook, $c$, a pivoted stop, $m$, catching in a notch in the lever-end of the hook and holding it firmly in position, a spring, $n$, which presses the stop against the hook, and a trigger, $o$, to which the rope $r$ is attached, and which serves to pull the stop out of the notch and thus release the hook. The whole apparatus is exceedingly simple and effective, holding the block I securely until the rope is pulled, and then disengaging it instantaneously and allowing the weight of the load to spread the tines at once and discharge the hay. On account of its extreme simplicity of construction and operation, the instrument thus described is not liable to get out of order, but with ordinary care will last many years.

Having thus described my invention, what I claim as new, and desire to secure by Letters Patent, is—

1. The combination of plate C, hook $c$, stop $m$, spring $n$, trigger $o$, and rope or chain $r$, substantially as and for the purpose described.

2. The combination of the tripping-attachment, above described, with the arms $a\ a$, shanks $s\ s$, tines $t\ t$, block I, and connecting-cords, chains, or rods $e\ e'$, substantially as and for the purposes specified.

To the above specification of my improvement I have signed my hand, this 9th day of July, 1868.

CHARLES S. AMBRUSTER.

Witnesses:
CHAS. A. PETTIT,
SOLON C. KEMON.